US011210652B2

(12) United States Patent
Agarwal et al.

(10) Patent No.: US 11,210,652 B2
(45) Date of Patent: Dec. 28, 2021

(54) SYSTEMS AND METHODS FOR PROCESSING PURCHASE TRANSACTIONS USING A MOBILE DEVICE

(71) Applicant: Celligence International LLC, Guaynabo, PR (US)

(72) Inventors: Pavan Agarwal, Cerritos, CA (US); Gabriel Albors Sanchez, Cerritos, CA (US); Jonathan Ortiz Rivera, Cerritos, CA (US)

(73) Assignee: Celligence International LLC, Guaynabo, PR (US)

( * ) Notice: Subject to any disclaimer, the term of this patent is extended or adjusted under 35 U.S.C. 154(b) by 220 days.

(21) Appl. No.: 16/015,098

(22) Filed: Jun. 21, 2018

(65) Prior Publication Data
US 2019/0392423 A1  Dec. 26, 2019

(51) Int. Cl.
*G06Q 20/34* (2012.01)
*G06Q 20/20* (2012.01)
*G06Q 20/32* (2012.01)
*G06Q 20/38* (2012.01)

(52) U.S. Cl.
CPC ........... *G06Q 20/34* (2013.01); *G06Q 20/202* (2013.01); *G06Q 20/322* (2013.01); *G06Q 20/385* (2013.01)

(58) Field of Classification Search
CPC .... G06Q 20/34; G06Q 20/202; G06Q 20/322; G06Q 20/385
USPC ........................ 705/21, 16, 67, 44, 39, 26.41
See application file for complete search history.

(56) References Cited

U.S. PATENT DOCUMENTS

| 8,639,619 | B1* | 1/2014 | Priebatsch | G06Q 20/3278 |
| | | | | 705/39 |
| 8,682,802 | B1 | 3/2014 | Kannanari | |
| 9,721,249 | B2 | 8/2017 | Mattsson et al. | |
| 2013/0246203 | A1* | 9/2013 | Laracey | G06Q 20/401 |
| | | | | 705/21 |
| 2013/0275308 | A1* | 10/2013 | Paraskeva | G06Q 20/02 |
| | | | | 705/71 |
| 2014/0058866 | A1 | 2/2014 | Okadome | |

(Continued)

FOREIGN PATENT DOCUMENTS

EP    2131302 A2    12/2009

OTHER PUBLICATIONS

International Search Report and Written Opinion in PCT/US19/38338, dated Sep. 11, 2019.

*Primary Examiner* — Vanel Frenel
(74) *Attorney, Agent, or Firm* — Sheppard Mullin Richter & Hampton LLP

(57) ABSTRACT

Systems and methods are provided for enabling an ecommerce purchase transaction on a mobile device without requiring a user to enter payment card information during each transaction. A payment card token may be generated by the mobile payment application in response to receiving payment card information associated with a payment card. A unique user code associated with the payment card token may be generated. A payment card token may be communicated via a magnetic stripe reader communicatively coupled to the mobile device. The ecommerce purchase transaction may be completed by sending the payment card token from the mobile device to an online merchant upon entering the requisite unique user code.

18 Claims, 7 Drawing Sheets

(56) References Cited

U.S. PATENT DOCUMENTS

| | | | | |
|---|---|---|---|---|
| 2014/0108261 A1* | 4/2014 | Priest | ................... | G06Q 20/202 |
| | | | | 705/67 |
| 2014/0222599 A1* | 8/2014 | Wang | ................... | G06Q 20/027 |
| | | | | 705/21 |
| 2014/0279556 A1* | 9/2014 | Priebatsch | ....... | G06Q 20/38215 |
| | | | | 705/67 |
| 2014/0344153 A1* | 11/2014 | Raj | ...................... | G06Q 20/027 |
| | | | | 705/44 |
| 2014/0365374 A1* | 12/2014 | Baldwin | .............. | G06Q 20/354 |
| | | | | 705/65 |
| 2014/0379578 A1* | 12/2014 | Chan | ................... | G06Q 20/322 |
| | | | | 705/44 |
| 2015/0088746 A1 | 3/2015 | Hoffman | | |
| 2015/0206117 A1* | 7/2015 | Govindarajan | ...... | G06Q 20/204 |
| | | | | 705/64 |
| 2017/0011440 A1* | 1/2017 | Shauh | ................ | G06Q 30/0613 |
| 2018/0150832 A1* | 5/2018 | Badal-Badalian | ..... | G06Q 30/06 |
| 2019/0080316 A1* | 3/2019 | Douglas | ............. | G06Q 20/3278 |
| 2019/0347646 A1* | 11/2019 | Laracey | ............. | G06Q 30/0226 |
| 2020/0034807 A1* | 1/2020 | Shamai | ................ | G06Q 20/325 |

\* cited by examiner

SYSTEMS AND METHODS FOR PROCESSING PURCHASE TRANSACTIONS USING A MOBILE DEVICE

TECHNICAL FIELD

The present disclosure is generally related to processing purchase transactions on a mobile device. More particularly, the present disclosure is directed to systems and methods for processing purchase transactions on a mobile device using a payment card token.

BACKGROUND

In today's mobile economy, people spend more of their time on their mobile phones in contrast to their time on a desktop computer. In particular, more ecommerce traffic is coming from mobile devices. The convenience of buying merchandise on a mobile device is self-evident. Consumers tend to browse online merchandise in quick shopping sessions during spare pockets of time corresponding, for example, to the time of their daily commutes or even driving in traffic. Because consumers tend to use their mobile devices in limited short shopping sessions, some transactions will go uncompleted. Consumers will add merchandise to a virtual shopping cart but will often abandon the transaction without completing it. When faced with prompts to enter their payment card information, consumers will often choose to disengage rather than look for their payment information. In some instances, payment card information may not be readily available or cannot be entered safely. As a result, online merchants loose potential business and customers fail to purchase the merchandise they seek.

All major credit card brands, including Visa®, Mastercard®, American Express®, Discover®, etc., charge convenience fees when processing online or non-face-to-face transactions to recoup the cost of processing an ecommerce or telephone payment transaction. Online merchants have a choice of either bearing the cost of the convenience fees or passing it onto consumers. Each of these solutions results in revenue loss for the merchant.

SUMMARY

In accordance with one or more embodiments, various features and functionality can be provided to enable or otherwise facilitate an ecommerce purchase transaction on a mobile device without requiring a user to enter payment card information during each transaction. Particularly, in accordance with one aspect of the invention, a payment card token associated with a mobile device and a unique user code associated with the payment card token can be implemented with ecommerce transaction systems.

In one embodiment, a payment card token may be generated by the mobile payment application in response to receiving payment card information associated with a payment card issued by a financial institution, such as a bank. For example, payment card information may be entered by a user or communicated into a mobile payment application from the payment card via a communication link between the payment card and the mobile device, when the payment card is in close proximity to the mobile device.

The payment card token generated by the mobile payment application may be associated with a mobile phone number. Further, the mobile payment application may generate a unique user code associated with the payment card token. The payment card token and the unique user code may be stored within the mobile payment application or the mobile device. Payment card information used to generate payment card token, however, will not be stored within the mobile payment application or the mobile device eliminating the need for additional security measures to safeguard payment card information. Further, the payment card token generated from the payment card information entered once, may be employed during each subsequent ecommerce purchase transactions on the mobile device thereafter. The ecommerce purchase transaction may be completed by sending the payment card token from the mobile payment application on the mobile device to an online merchant upon entering the requisite unique user code. This ensures that only a user in possession of the unique user code may be authorized to employ the payment card token associated with the payment card on the same mobile device used to enter the payment card information.

In one embodiment, a payment card such as a credit or debit card can include various forms of technology to store data, such as a magnetic-stripe technology, processor or smart card technology, bar code technology or other technology used to encode payment card information. For example, a payment card token may be communicated via a magnetic stripe reader communicatively coupled to the mobile device. Using the payment card token that has been encoded onto the payment card in ecommerce purchase transactions may lower or eliminate convenience fees that the issuing financial institution may charge during a non-face-to-face purchase transaction.

In accordance with another embodiment, the mobile payment application may communicate with the issuing financial institution's server via a mobile payment application server to obtain a payment card token generated by the issuing card server. The issuing card server may transmit the payment token to the payment application server. In some embodiments, the payment card token obtained from an issuing card server may be associated with a unique user code generated by the system as another part of the multi-factor authentication protocol. A user may be required to enter the unique user code to initiate a purchase transaction using the payment card token.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
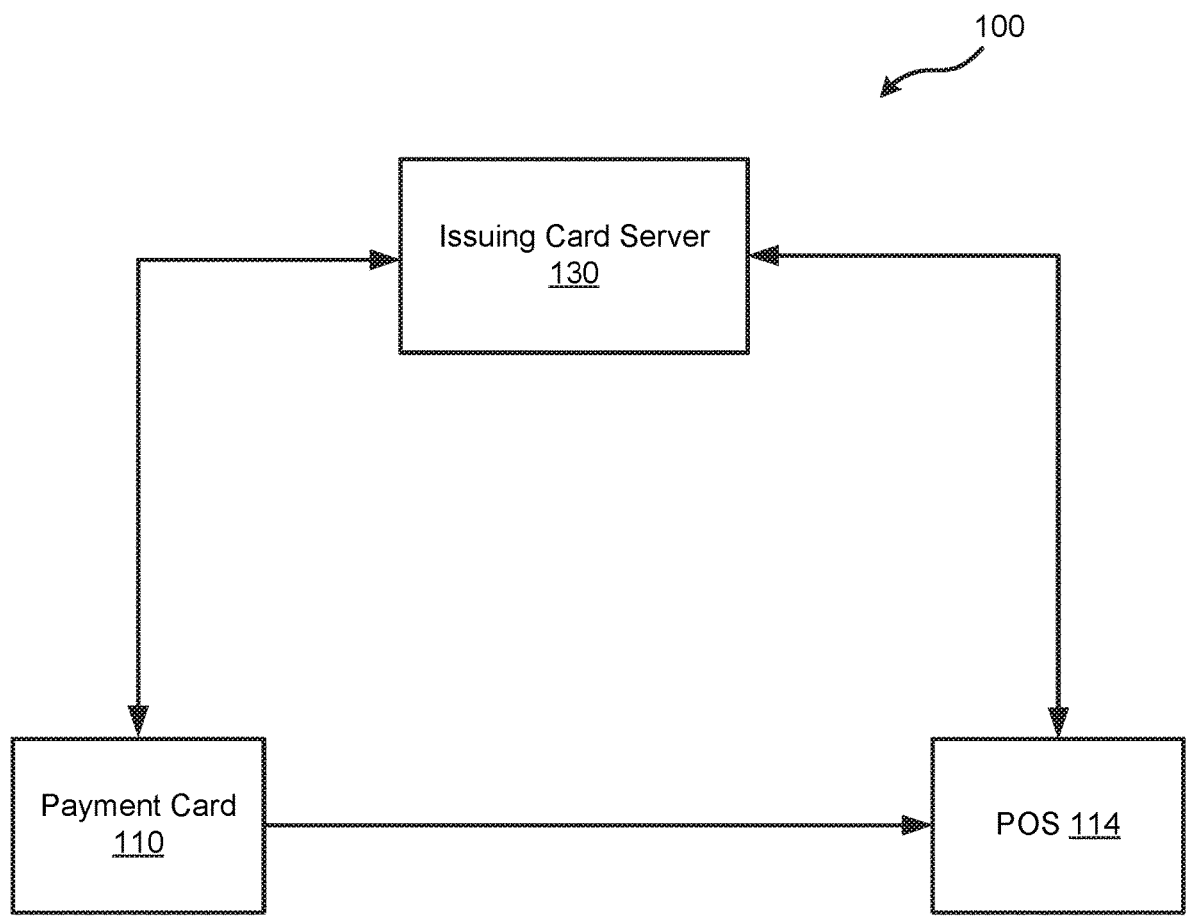
FIG. 1 illustrates an example system configured for providing payment information in a POS purchase transaction.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

Embodiments disclosed herein relate to systems and methods for processing payment information in an ecommerce purchase transaction using a mobile device. One hinderance to completing ecommerce transactions is the amount of effort it requires for a user to enter the payment card information. Because users tend to use their mobile devices in limited short shopping sessions, some transactions will go uncompleted. Users will add merchandise to a virtual shopping cart but will often abandon the transaction without completing it. Typically, to complete the ecommerce purchase transaction, a user must enter payment card information including a payment card number, an expiration date, a cardholder name, and a security or CVVN code. This requires a substantial amount of interaction by the user. In some instances, the payment card information may not be readily available or cannot be entered safely, if the user is driving, for example. Some embodiments disclosed herein enable a user to safely provide payment card information to an online merchant without having to manually enter payment card information during an ecommerce purchase transaction using a mobile device.

Transaction processing of electronic payments, in conventional or face-to-face purchase transactions, can include a merchant obtaining payment card information and using that payment card information to authorize the transaction by confirming with the issuing financial institution that a cardholder has a sufficient line of credit to cover a proposed payment. FIG. 1 depicts an example face-to-face payment card transaction processing system 100 in which a user presents payment card 112 in a face-to-face transaction to purchase goods or services from a merchant at point of sale (POS) terminal 114. Payment card 112 may include a conventional magnetic-stripe credit, debit card, or similar proximity payment device. It is understood that prior to the occurrence of such a transaction, the user was issued payment card 110 by an issuing financial institution. After presentation of payment card 110 to the merchant by the user, the merchant may obtain payment authorization for the purchase transaction from the issuing financial institution by communicating with issuing financial institution's server 130 to via POS terminal 144 located at or otherwise controlled by the merchant. The issuing financial institution either approves or declines the payment authorization request and thereafter transmits the response back to the merchant. The merchant may then either complete or cancel user's purchase transaction based upon the response to the payment authorization request. If the user's purchase transaction is authorized, the transaction amount will be sent from the issuing financial institution to the merchant's bank. The transaction amount, minus certain fees, will thereafter be deposited within a financial account belonging to the merchant. The issuing financial institution thereafter bills the user for all transactions conducted over a given period of time and the user, in turn, submits payment(s) to the issuing financial institution.

Figure 2A:
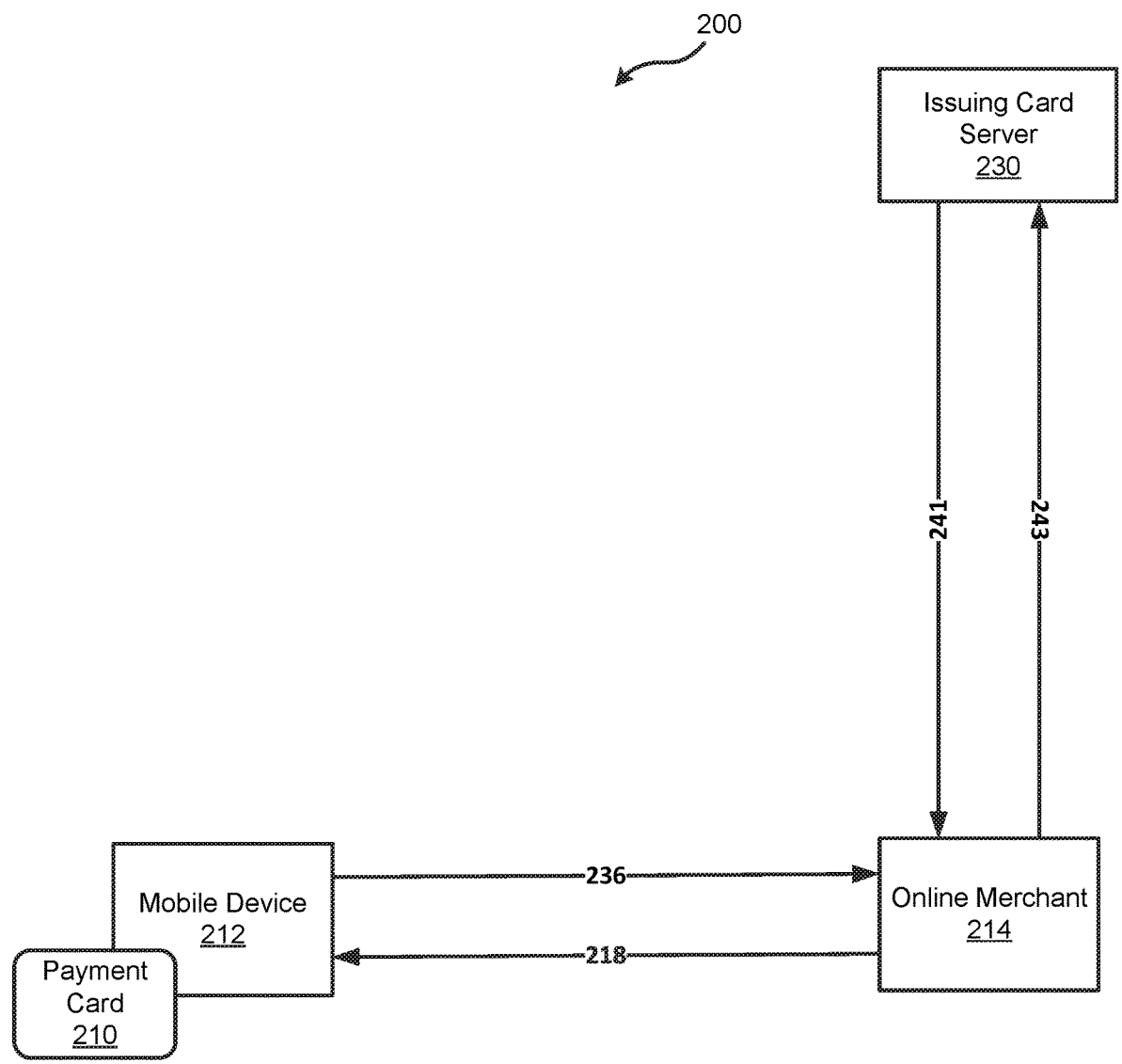
FIG. 2A illustrates an example system configured for providing payment information in an online purchase transaction using a mobile device.

Similarly, a user attempting to complete an ecommerce purchase transaction is required to provide payment card information to an online merchant. This is done by a user manually entering payment card information into an online merchant's ecommerce user interface via a mobile device. FIG. 2A illustrates an example non-face-to-face payment card transaction processing system 200 configured for providing payment information in an ecommerce purchase transaction using a mobile device. Referring to FIG. 2A, the system may include mobile device 212 used by a user to purchase goods and/or services from online merchant 214 using payment card 210. Payment card 210 may include a conventional magnetic-stripe credit, debit card, or similar proximity payment device. During an ecommerce purchase transaction, online merchant 214 may request payment card information 210 form the user connected to online merchant's ecommerce user interface via mobile device 212 (as indicated by arrow 218). The user may complete the ecommerce purchase transaction with online merchant 214 by transmitting payment card information to online merchant 214 (as indicated by arrow 236). Online merchant 214 may use the payment card information to obtain payment authorization for the ecommerce purchase transaction communicating with issuing financial institution's payment card server 230 (as indicated by arrow 241). Issuing card server 230 will then approve or decline the payment authorization request and thereafter transmit the response back to online merchant 214 (as indicated by arrow 243). Mobile device 212 can be connected to the Internet or other communication networks or channels, which can provide connectivity to online merchant 214 for entering into various ecommerce purchase transactions. As alluded to earlier, the user in a typical ecommerce purchase transaction, will enter payment card information during each ecommerce purchase transaction.

In some embodiments, a user may enter payment card information associated with a payment card issued to the user into a mobile payment application on a mobile device. The mobile payment application will generate a payment card token based on the payment card information and associate with the mobile device. That is the payment card information may be entered once while the payment card token may be employed during each subsequent ecommerce purchase transactions on the mobile device thereafter.

The payment card token may be generated through a process of tokenization in which a primary account number (PAN) is replaced with a surrogate value, i.e. a token. De-tokenization is a reverse process of redeeming a token for its associated PAN value. The security of an individual token relies predominantly on the infeasibility of determining the original PAN knowing only the surrogate value. Using a token eliminates the need for a level of protection associated with the use of PAN. Storing tokens instead of PANs helps reduce the amount of cardholder data in the environment, potentially reducing the effort required to implement Payment Card Industry Data Security Standard (PCI DSS) requirements. By way of example, a payment card token can be single, multi-use, cryptographic or non-cryptographic, reversible or irreversible, authenticable or non-authenticable.

In some embodiments, the payment card token may be generated by the mobile payment application in response to the payment card information communicated into the mobile payment application. The communication may include data entry, voice entry, and/or other such ways of communicating payment card information. In some embodiments, payment card information may be communicated into a mobile payment application from the payment card via a communication link between a payment card and a mobile device when the payment card is in close proximity to the mobile device. By way of example, a user may tap and/or touch the payment card on a mobile device. In yet another example, a user can swipe the payment card on a mobile device using a magnetic card reader communicatively coupled to the mobile device.

As a further example, a payment card such as a credit or debit card can include various forms of technology to store data, such as a magnetic-stripe technology, processor or smart card technology, bar code technology or other technology used to encode payment card information including PAN or other identification or information. As such, a properly encoded token within the payment card can include various forms of information relating to the user such as, for example, the identity of the user, information associated with the user's account, the issuing bank or other financial institution, the expiration date, and so on.

Figure 2B:
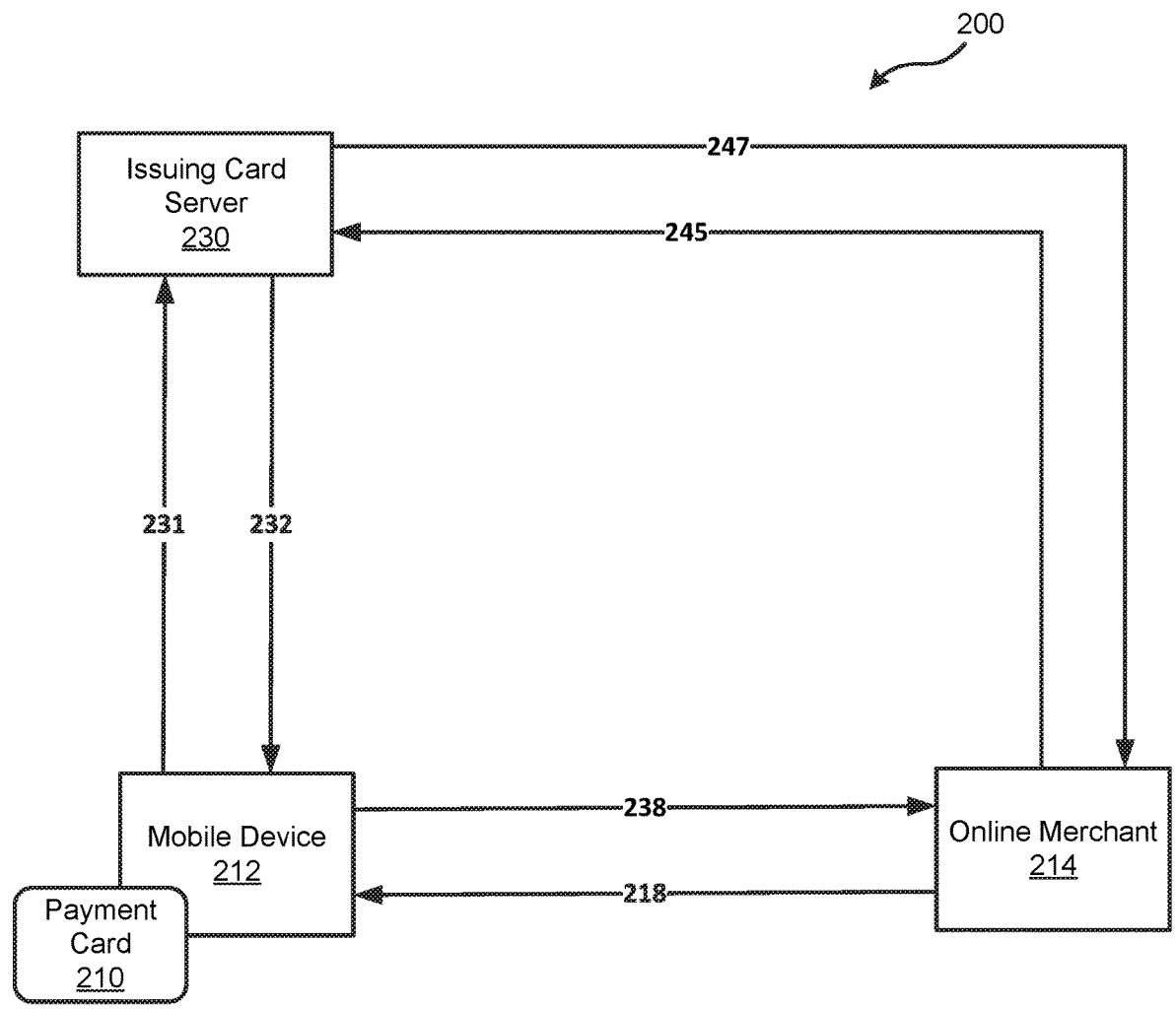
FIG. 2B illustrates an example system for providing for providing payment card token as payment information in an online purchase transaction using a mobile device.

To better illustrate the features of the invention, this example is described in terms of the payment card token being a payment card having payment card token information encoded in a magnetic stripe on the back of the payment card. As illustrated in FIG. 2B, non-face-to-face payment card transaction processing system 200 is provided by which the user communicates during the course of a transaction. The system 200 might include, for example, mobile device 212 communicatively coupled to a magnetic stripe reader (or other token readers). In one embodiment, payment card transaction processing system 200 might be implemented with the capability to obtain the payment card token and encrypt some or all of the payment card token information and payment card information associated with the payment card token. Preferably, payment card token information is encrypted before it leaves the reader (in the read head or otherwise in the reader) or before it leaves the payment card transaction processing system 200. In some embodiments, the mobile payment application running on mobile device 212 may encrypt the payment card information entered by the user and generate a payment card token and associate it with mobile device 212. During an ecommerce purchase transaction, online merchant 214 may request payment card information 210 form the user connected to online merchant's ecommerce user interface via mobile device 212 (as indicated by arrow 218). The user may complete the ecommerce purchase transaction with online merchant 214 by transmitting encrypted payment card information associated with the payment card token stored on mobile device 212 to online merchant 214 (as indicated by arrow 238). Online merchant 214 may use the payment card information to obtain payment authorization for the ecommerce purchase transaction by communicating with issuing financial institution's payment card server 230 (as indicated by arrow 245). Payment card server 230 will then approve or decline the payment authorization request and thereafter transmit the response back to online merchant 214 (as indicated by arrow 247).

The payment card token may be securely stored within a mobile payment application server and used to redeem the payment card information, which will be sent in an encrypted transmission to a merchant during the ecommerce purchase transaction.

Employing the payment card token eliminates the need to enter payment card information during each individual ecommerce purchase transaction performed on the mobile device and ensures that only an authorized user of the mobile device can utilize the payment card token stored therein.

Further, in some embodiments, the payment card token may be associated with a unique user code generated by the system as another part of the multi-factor authentication protocol. A user may be required to enter the unique user code to initiate the ecommerce purchase transaction using the payment card token. This ensures that the payment card token can be used only by an authorized user. That is, a user must be in possession of the unique user code associated with the payment card token and must use it on the device used to request the payment card token from the issuing financial institution. In some embodiments, the payment card token may be associated with the user's mobile device and a unique user code as part of a multi-factor authentication protocol. By way of example only, a unique user code may include a multi-character alpha-numeric string that is typed into a mobile device by the user.

Figure 3:
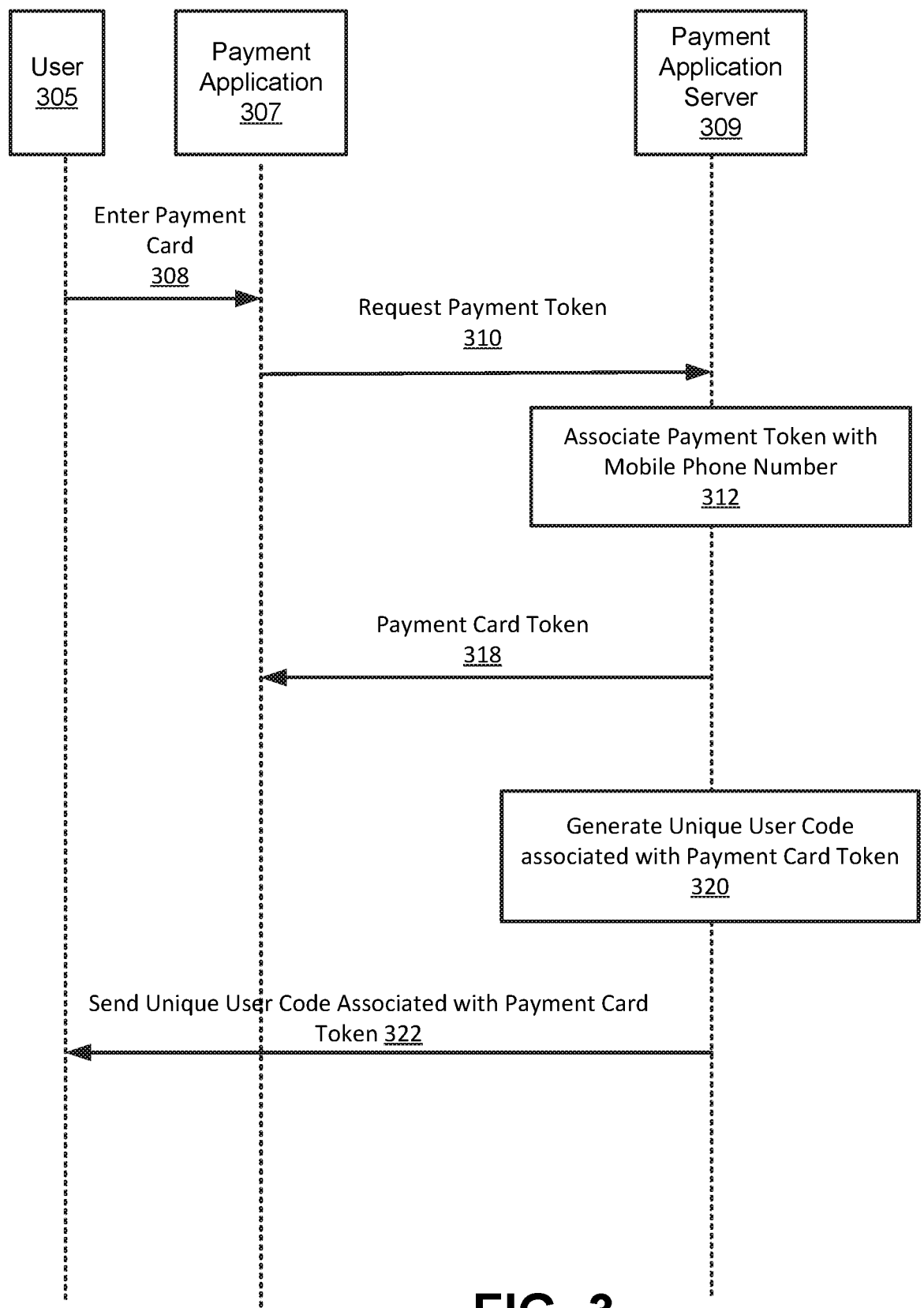
FIG. 3 is a flow chart illustrating various operations that may be performed to associate a payment card token with a mobile phone number and a unique user code, in accordance with embodiments disclosed herein.

As illustrated in FIG. 3, user 305 may enter payment card information into mobile payment application 307 installed on a mobile device (operation 308). Mobile payment application 307 may establish a connection with mobile payment application server 309 and send a request to generate a payment card token associated with payment card information (at operation 310). The payment card token request includes the payment card information provided by user 305 and a mobile phone number associated with the mobile device. Mobile payment application server 311 may generate a payment card token based on the payment card information and thereafter associate it with the mobile phone number provided in the payment card token request (at operation 312). The payment card token may be sent to mobile payment application 307 (at operation 318). Further, mobile payment application server 309 may generate a 4-digit unique user code based on the payment card token (at operation 320). The unique user code associated with the payment card token may be sent to user 305 (at operation 322).

The unique user code may be stored within mobile payment application 307, mobile payment application server 309, or both. The unique user code associated with individual payment card token may be used to authorize the use of the payment card token during the ecommerce purchase transaction. The payment card token may be stored within mobile payment application 307, mobile payment application server 309, or both. The payment card token may be transmitted from the mobile device to a merchant to complete the ecommerce purchase transaction. Payment card information entered by user 305 used to generate payment card token is not stored within mobile payment application 307 or mobile payment application server 309.

Another issue plaguing ecommerce purchase transactions are various fees that major credit card brands, including Visa®, Mastercard®, American Express®, Discover®, etc., charge when processing non-face-to-face transactions to recoup the cost of processing an ecommerce or telephone payment transaction. That is, in a face-to-face transaction, the fees charged by the issuing financial institution may be less than those imposed during a non-face-to-face transaction. For example, a user may purchase goods or services from a merchant in an ecommerce or a telephone payment channel by electronically transmitting payment card (or a payment card token) information to the merchant. Next, the merchant obtains transaction authorization by communicating the payment card information (or the payment card token) to an issuing card financial institution. In this example, because the payment information (or the payment card token) was not obtained directly from the payment card (e.g., by swiping a magnetic stripe on the back of the payment card), the issuing financial institution may charge a convenience fee for processing a purchase transaction request.

As such, in some embodiments, the payment card token may be obtained from the payment card having the payment card token information encoded in a magnetic stripe on the back of the payment card swiping the payment card through a magnetic card reader communicatively coupled to the mobile device. When used in a purchase transaction, the payment card token encoded in a magnetic stripe of the payment card may lower or eliminate convenience fees that the issuing financial institution may charge during a non-face-to-face purchase transaction.

In the current example of non-face-to-face payment card processing system 300, the mobile device may accept a payment card having a magnetic stripe via a magnetic stripe reader communicatively coupled to the mobile device, however, the system 300 can include any of a variety of forms of magnetic stripe readers to extract the data from the credit card. In other embodiments or implementations, other forms of purchaser data capture devices, or readers, can be communicatively coupled to the mobile device and used to obtain the information from a variety of different types of payment card tokens. For example, bar code scanners, smart card readers, RFID readers, near-field devices, and other mechanisms can be used to obtain some or all of the data associated with a payment card token used in the ecommerce purchase transaction.

In other embodiments, the mobile payment application may communicate with the issuing financial institution's server via the mobile payment application server to obtain a payment card token generated by the issuing card server. Referring back to FIG. 2B, a user may enter payment card 210 information into a mobile payment application installed on mobile device 212. The mobile payment application may request a payment card token (as indicated by arrow 231) from issuing card server via a mobile payment application server. The issuing card server may transmit the payment token (as indicated by arrow 232) to the payment application server and store it on mobile device 212. During an ecommerce purchase transaction, online merchant 214 may request payment card information 210 form the user connected to online merchant's ecommerce user interface via mobile device 212 (as indicated by arrow 218). The user may complete the ecommerce purchase transaction with online merchant 214 by transmitting a payment card token stored on mobile device 212 to online merchant 214 (as indicated by arrow 238). Online merchant 214 may use the payment card token to obtain payment authorization for the ecommerce purchase transaction communicating with issuing financial institution's payment card server 230 (as indicated by arrow 245). The issuing payment card server 230 may redeem the payment card token to obtain a PAN. Payment card server 230 will then approve or decline the payment authorization request and thereafter transmit the response back to online merchant 214 (as indicated by arrow 247).

In some embodiments, the payment card token obtained from the issuing card server may be associated with the unique user code generated by the system as another part of the multi-factor authentication protocol. A user may be required to enter the unique user code to initiate a purchase transaction using the payment card token. This ensures that the payment card token can be used only by an authorized user. That is, a user must be in possession of the unique user code associated with the payment card token and must use on the device used to request the payment card token from the issuing financial institution.

Figure 4:
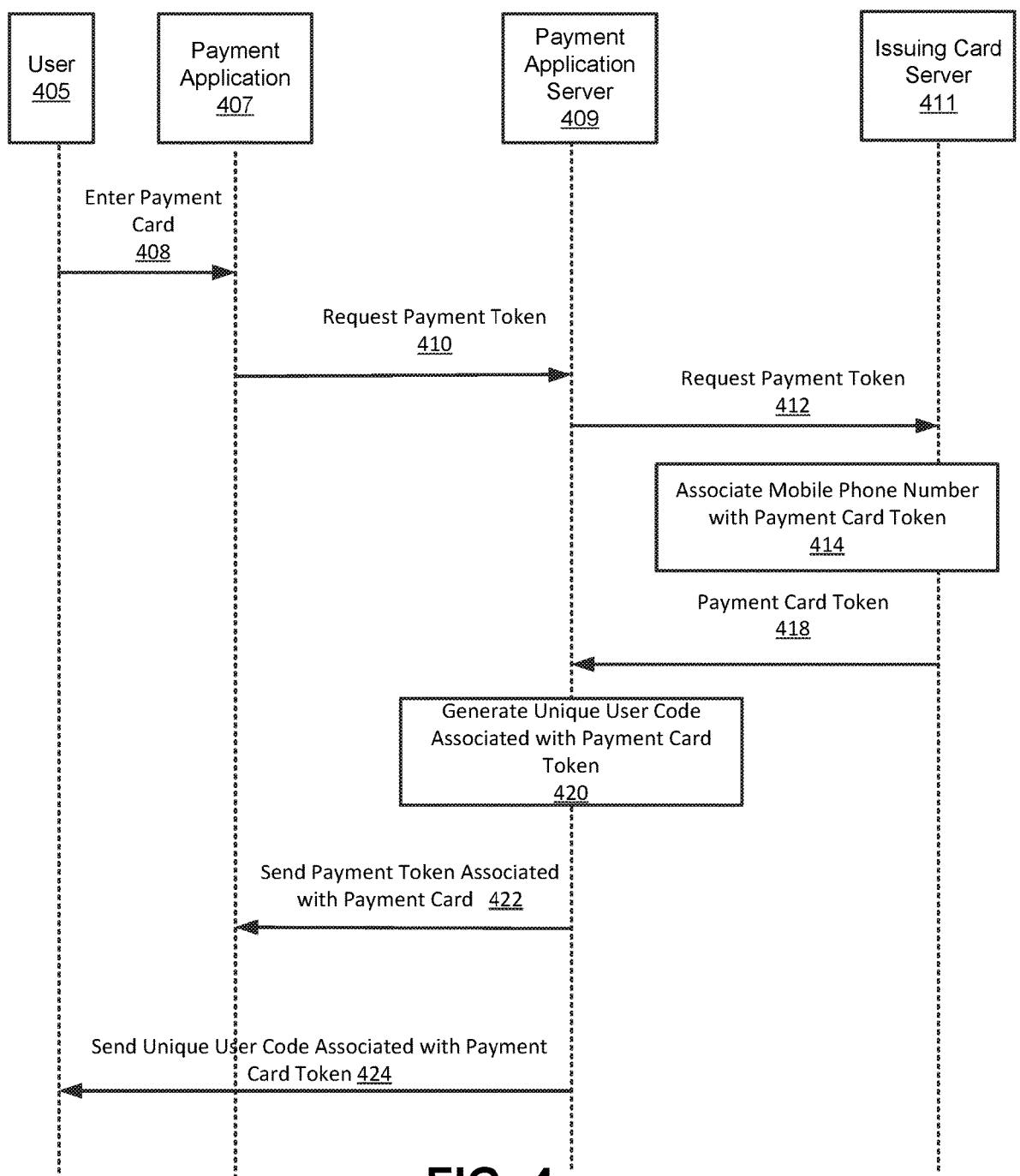
FIG. 4 is a flow chart illustrating various operations that may be performed to associate a payment card token obtained from an issuing card server with a mobile phone number and a unique user code, in accordance with embodiments disclosed herein.

Referring to FIG. 4, user 405 may enter payment card information into mobile payment application 407 installed on a mobile device (operation 408). Mobile payment application 407 may establish a connection with mobile payment application server 409 and send a request to obtain a payment card token associated with payment card information entered by user 405 (at operation 410). Mobile payment application server 409 may establish a secure connection with issuing card server 411 and send a request for a payment card token (at operation 412). The payment card token request includes the payment card information provided by user 405 and a mobile phone number associated with the mobile device. Issuing card server 411 may retrieve payment card token and thereafter associates it with the mobile phone number (at operation 414). Alternatively, issuing card server 411 may generate the payment card token and thereafter associate it with the mobile phone number provided in the payment card token request. Further, mobile payment application server 409 may generate a unique user code based on the payment card token (at operation 420). The payment card token may be sent thereafter to mobile payment application 407 (at operation 422) and the unique user code associated with the payment card token may be sent to user 405 (at operation 424).

In some embodiments, the issuing financial institution may authenticate a purchase transaction authorization request submitted by the merchant by employing user's mobile device phone number used in an ecommerce purchase transaction. In some embodiments, a user may utilize a single payment card token associated with a payment card to complete multiple ecommerce purchase transactions with multiple merchants.

Figure 5:
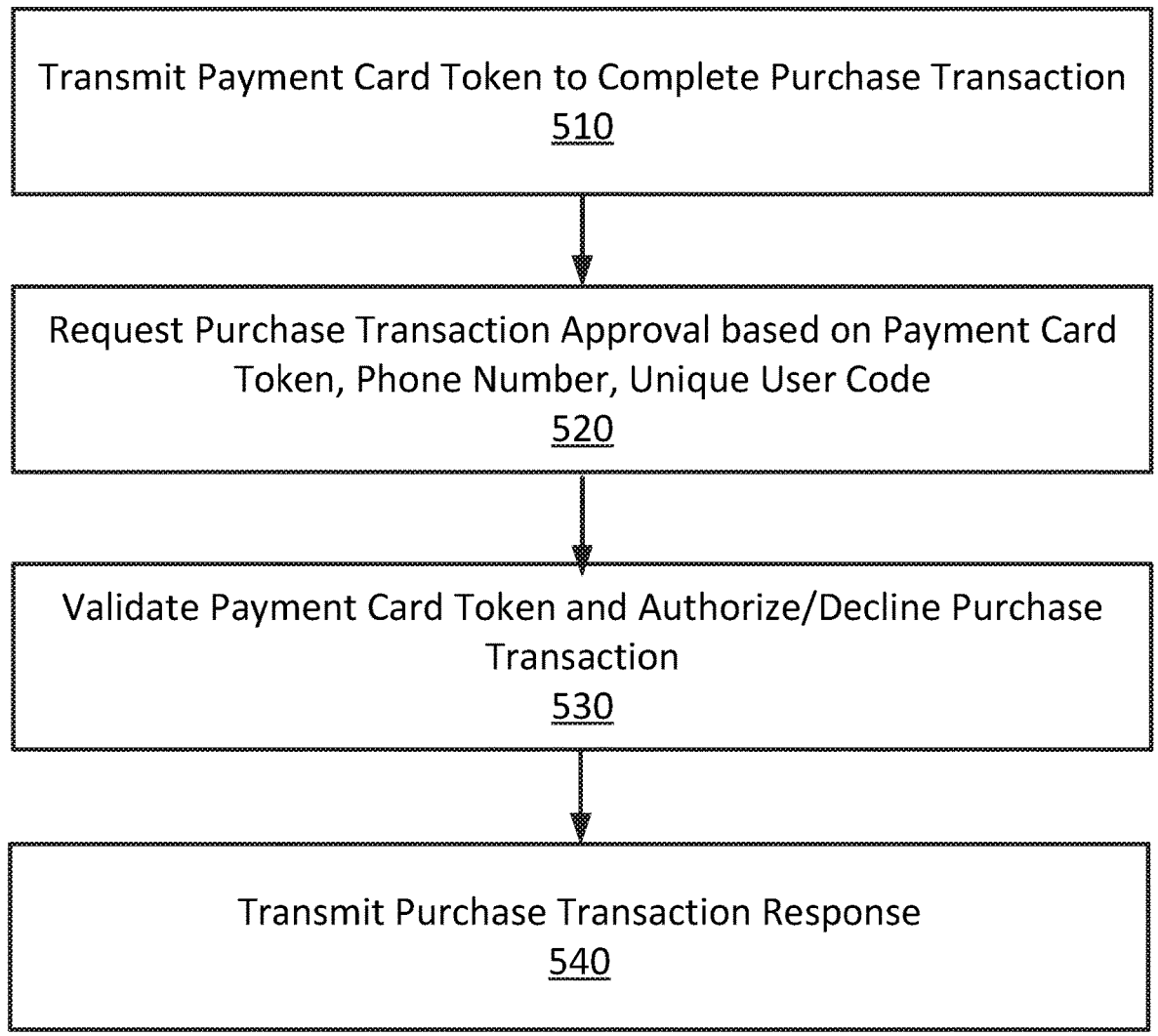
FIG. 5 is flow chart illustrating various operations that may be performed during an online purchase transaction, in accordance with embodiments disclosed herein.

FIG. 5, illustrates a flow chart describing various processes that can be performed in order to complete an ecommerce purchase transaction in accordance with one embodiment. At operation 510, a payment card token is transmitted from the mobile device to a merchant. As described above, the payment card token may be generated by a mobile payment application in response to communicated payment card information, which may be obtained from a magnetic stripe of a payment card, and/or an issuing card server. The payment card token can be received prior to the initiation of a purchase transaction process and/or during processing of a purchase transaction. At operation 520, the merchant requests an approval of the purchase transaction from the issuing card server based on the payment card token by sending a purchase approval request. The purchase approval request is processed by the issuing card server. At operation 530, the issuing card sever authenticates the payment card token by verifying that the phone number from which it was submitted was the same phone number used during payment card token generation and/or request. Upon a satisfactory completion of the verification step, the issuing card server authorizes the purchase transaction using payment card information associated with the payment card token. Finally, at operation 540, an authorization response message is transmitted to the merchant. The authorization response message includes a message approving or declining the purchase transaction depending upon whether or not the requisite funds associated with the payment card are available.

Figure 6:
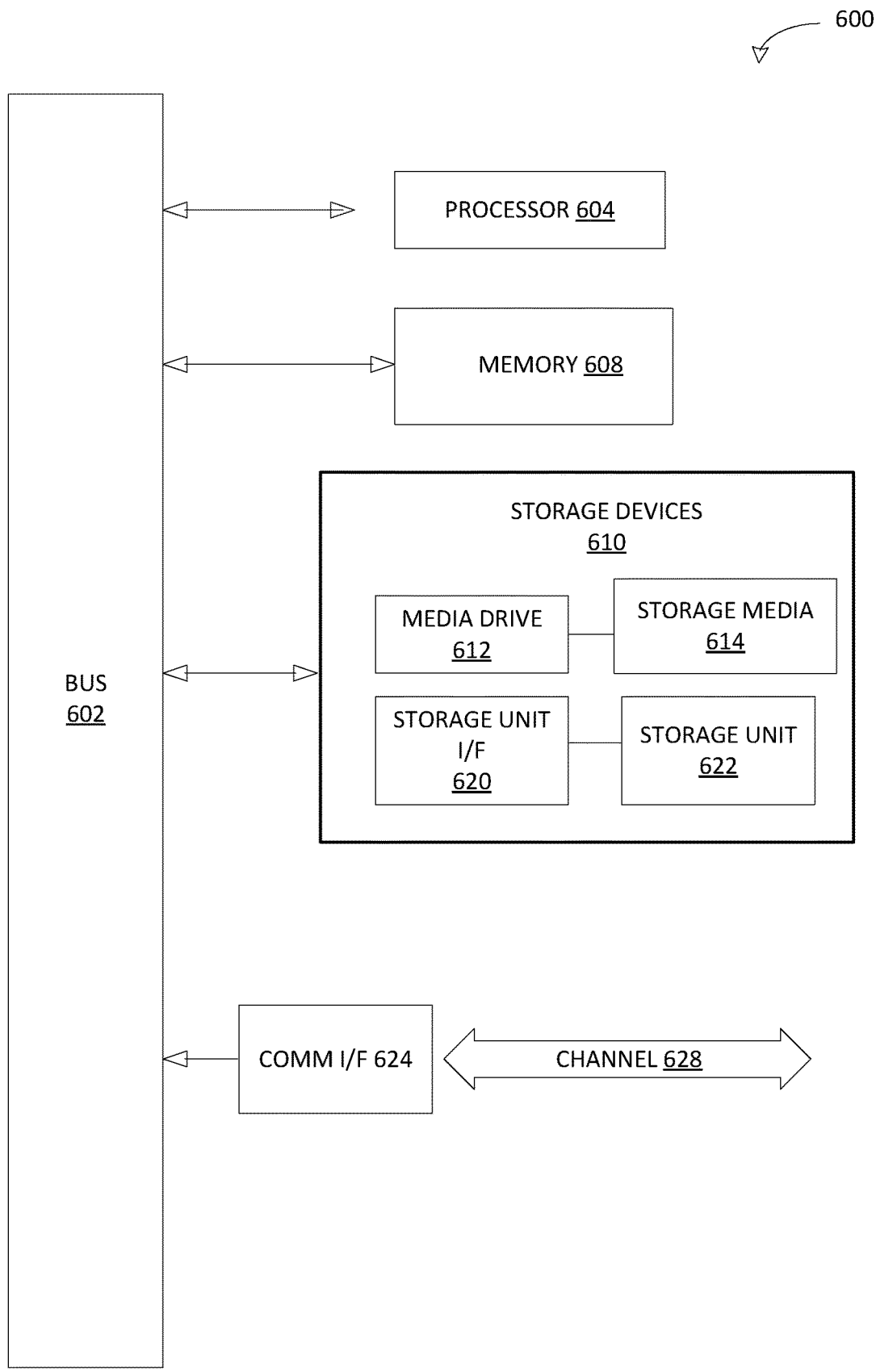
FIG. 6 illustrates an example computing component that may be used in implementing various features of embodiments of the disclosed technology.

FIG. 6 illustrates an example computing module 600, an example of which may be a processor/controller resident on a mobile device or POS terminal, or a processor/controller used to operate a payment transaction device, that may be used to implement various features and/or functionality of the systems and methods disclosed in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage devices 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage devices 610 might include other similar instrumentalities for allowing computer programs or other instructions or data to be loaded into computing module 600. Such instrumentalities might include, for example, a fixed or removable storage unit 622 and a storage unit interface 620. Examples of such storage units 622 and storage unit interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit interface 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for providing payment information in an online purchase transaction using a mobile device, the method comprising:
    obtaining a unique user code in response to receiving, on a mobile device mobile payment application, a payment request sent from an online merchant;
    upon validating the unique user code, obtaining a payment token using the unique user code, wherein the payment token is used to obtain payment card information associated with a payment card; and
    transmitting a payment response from the mobile device application to the online merchant, wherein the payment response comprises the payment card information;
    wherein the unique user code is generated based on the payment card token and is used to associate the unique user code with the payment token; and
    wherein the unique code is provided to the user prior to receiving they payment request; and
    wherein the previously provided unique user is obtained as user input via the mobile device mobile payment application to authenticate the user as part of multi-factor authentication protocol.

2. The method of claim 1, wherein the payment token is generated by the mobile device mobile payment application in response to a user request to uniquely associate the payment card with the mobile device.

3. The method of claim 2, wherein the payment token is stored on the mobile device.

4. The method of claim 2, wherein the user request to uniquely associate the payment card with the mobile device comprises swiping the payment card through a magnetic card reader.

5. The method of claim 1, wherein the unique user code is associated with the payment token such that access to the payment token is based upon the unique user code.

6. The method of claim 1, wherein the unique user code comprises a 4-character code.

7. The method of claim 1, wherein obtaining the unique user code is performed in response to receiving, on the mobile device mobile payment application, the payment information request sent from a merchant point-of-sale (POS) terminal.

8. The method of claim 1, wherein obtaining the payment card information associated with the payment card comprises establishing a connection with a payment card issuing server.

9. The method of claim 8, wherein the payment card issuing server transmits the payment card information upon verifying the payment token is associated with the mobile device.

10. A system for providing payment information in an online purchase transaction using a mobile device, the system comprising:
   one or more physical processors configured by machine-readable instructions to:
   obtain a unique user code in response to receiving, on the mobile device, a payment information request sent from a mobile device mobile payment application via a payment network;
   upon validating the unique user code, obtain a payment token using the unique user code, wherein the payment token is used to obtain payment card information associated with a payment card; and
   transmit a payment information response to the mobile device application, wherein the payment information response comprises the payment card information;
   wherein the unique user code is generated based on the payment card token and is used to associate the unique user code with the payment token; and
   wherein the unique code is provided to the user prior to receiving they payment request; and
   wherein the previously provided unique user is obtained as user input via the mobile device mobile payment application to authenticate the user as part of multi-factor authentication protocol.

11. The system of claim 10, wherein the payment token is generated by the mobile device mobile payment application in response to a user request to uniquely associate the payment card with the mobile device.

12. The system of claim 11, wherein the unique user code is associated with the payment token such that access to the payment token is based upon the unique user code.

13. The system of claim 11, wherein the user request to uniquely associate the payment card with the mobile device comprises swiping the payment card through a magnetic card reader.

14. The system of claim 10, wherein the payment token is stored on the mobile device.

15. The system of claim 10, wherein the unique user code comprises a 4-character code.

16. The system of claim 10, wherein obtaining the unique user code is performed in response to receiving, on the mobile device mobile payment application, the payment information request sent from a merchant point-of-sale (POS) terminal.

17. The system of claim 10, wherein obtaining the payment card information associated with the payment card comprises establishing a connection with a payment card issuing server.

18. The system of claim 17, wherein the payment card issuing server transmits the payment card information upon verifying the payment token is associated with the mobile device.

* * * * *